(12) United States Patent
Lv et al.

(10) Patent No.: US 12,548,350 B2
(45) Date of Patent: Feb. 10, 2026

(54) PARKING SPACE DETECTION METHOD AND APPARATUS, AND DEVICE AND STORAGE MEDIUM

(71) Applicant: NEUSOFT REACH AUTOMOTIVE TECHNOLOGY (SHENYANG) COMPANY, Shenfu New District (CN)

(72) Inventors: Jin Lv, Shenfu New District (CN); Wei Liu, Shenfu New District (CN); Jun Hu, Shenfu New District (CN)

(73) Assignee: NEUSOFT REACH AUTOMOTIVE TECHNOLOGY (SHENYANG) COMPANY, Shenfu New District (CN)

( * ) Notice: Subject to any disclaimer, the term of this patent is extended or adjusted under 35 U.S.C. 154(b) by 612 days.

(21) Appl. No.: 17/911,406

(22) PCT Filed: Jul. 17, 2020

(86) PCT No.: PCT/CN2020/102516
§ 371 (c)(1),
(2) Date: Sep. 13, 2022

(87) PCT Pub. No.: WO2021/184616
PCT Pub. Date: Sep. 23, 2021

(65) Prior Publication Data
US 2023/0102253 A1 Mar. 30, 2023

(30) Foreign Application Priority Data
Mar. 20, 2020 (CN) .......................... 202010200852.0

(51) Int. Cl.
*G06V 20/58* (2022.01)
*B60W 30/06* (2006.01)

(52) U.S. Cl.
CPC .......... *G06V 20/586* (2022.01); *B60W 30/06* (2013.01); *B60W 2420/403* (2013.01)

(58) Field of Classification Search
CPC ... G06V 20/586; G06V 10/774; B60W 30/06; B60W 2420/403; Y02T 10/40
(Continued)

(56) References Cited

U.S. PATENT DOCUMENTS

2013/0258107 A1 10/2013 Delibaltov et al.
2014/0097971 A1 4/2014 Barth
(Continued)

FOREIGN PATENT DOCUMENTS

CN 103366602 A 10/2013
CN 108564814 A 9/2018
(Continued)

OTHER PUBLICATIONS

Law, H., & Deng, J. (2018). Cornernet: Detecting objects as paired keypoints. In Proceedings of the European conference on computer vision (ECCV) (pp. 734-750). (Year: 2018).*
(Continued)

*Primary Examiner* — Jennifer Mehmood
*Assistant Examiner* — Dustin Bilodeau
(74) *Attorney, Agent, or Firm* — Kilpatrick Townsend & Stockton LLP

(57) ABSTRACT

A method and an apparatus for detecting a parking space, a device and a computer-readable storage medium are provided. The method includes: acquiring a top-view image of a scene; performing a learning process on the top-view image to obtain a center-point probability map and four inner-angular-point probability maps, and the center-point probability map includes a predicted probability of each pixel in the top-view image being a center point, each of the inner-angular-point probability maps includes a predicted probability of each pixel in the top-view image being an inner angular point, and the four inner-angular-point probability maps correspond to different types of inner angular
(Continued)

points of a parking space; and obtaining a parking space detection result for the top-view image based on the center-point probability map and four inner-angular-point probability maps.

9 Claims, 3 Drawing Sheets

(58) Field of Classification Search
USPC .......................................................... 382/100
See application file for complete search history.

(56) References Cited

U.S. PATENT DOCUMENTS

| | | | |
|---|---|---|---|
| 2015/0278611 A1* | 10/2015 | Chi .................... G06V 20/586 348/148 | |
| 2015/0364043 A1 | 12/2015 | Lee | |
| 2018/0246515 A1 | 8/2018 | Iwama et al. | |
| 2020/0152060 A1* | 5/2020 | Zhang .................... G08G 1/145 | |
| 2020/0341466 A1* | 10/2020 | Pham ..................... G06N 3/045 | |

FOREIGN PATENT DOCUMENTS

| | | | |
|---|---|---|---|
| CN | 109508682 A | 3/2019 | |
| CN | 109614914 A | 4/2019 | |
| CN | 109685000 A | 4/2019 | |
| CN | 109740584 A * | 5/2019 | |
| CN | 110348297 A | 10/2019 | |
| CN | 110400255 A | 11/2019 | |
| CN | 110706509 A | 1/2020 | |
| CN | 110766979 A | 2/2020 | |
| CN | 110796063 A * | 2/2020 | ......... G06K 9/00798 |
| JP | 2011034297 A | 2/2011 | |
| WO | 2020048152 A1 | 3/2020 | |

OTHER PUBLICATIONS

Wei Ma, "Research on Key Technologies of Parking Space Detection Based on Machine Vision", Master's Thesis of Xi'an University of Technology, Jan. 15, 2019, total 80 pages.
Mi Lei,"Research and Implementation of Parking slot markings recognition System based on vision", Master's Thesis off Northeastern University, May 15, 2015, total 83 pages.
Deepak Poddar et al.,"Deep Learning based Parking Spot Detection and Classification in Fish-Eye Images",2019 IEEE International Conference on Electronics, Computing and Communication Technologies, Dec. 21, 2019, total 5 pages.
State Intellectual Property Office of the People's Republic of China, first office Action Issued in Application No. 202010200852.0, Mar. 14, 2023, 9 pages.

* cited by examiner

PARKING SPACE DETECTION METHOD AND APPARATUS, AND DEVICE AND STORAGE MEDIUM

This application is the national phase of International Patent Application No. PCT/CN2020/102516, titled "PARKING SPACE DETECTION METHOD AND APPARATUS, AND DEVICE AND STORAGE MEDIUM", filed on Jul. 17, 2020, which claims priority to Chinese Patent Application No. 202010200852.0, titled "PARKING SPACE DETECTION METHOD AND APPARATUS, AND DEVICE AND STORAGE MEDIUM", filed on Mar. 20, 2020 with the China National Intellectual Property Administration, both of which are incorporated herein by reference in their entireties.

FIELD

The present disclosure relates to the field of image processing, and in particular to a method and an apparatus for detecting a parking space, a device, and a storage medium.

BACKGROUND

Automatic parking is an important part of autonomous driving technologies. The automatic parking is performed depending on accurate information of a parking space. According to the conventional technology, a parking space detection process is usually divided into multiple sub-tasks for execution. For example, intersection points of lines in an image is first detected, and two adjacent intersection points are determined as an intersection pair; parking space information is then determined based on an area formed by intersection pairs, where the parking space information includes a type of a parking space and an angle of the parking space; and another two points of the parking space is finally estimated based on the parking space information, to determine complete information of the parking space.

With the conventional technology, a parking space is detected through multiple stages, resulting in a low detection speed. In one embodiment, it is impossible to detect multiple types of parking spaces in a single detection process.

SUMMARY

In view of the above, a method and an apparatus for detecting a parking space, a device, and a storage medium are provided according to the present disclosure for detecting multiple types of parking spaces through the same process, in order to reduce the complexity and improve the speed of parking space detection.

Following are provided according to embodiments of the present disclosure.

According to one embodiment of the present disclosure, a method for detecting a parking space is provided. The method includes:
acquiring a top-view image of a scene;
performing a learning process on the top-view image to obtain a center-point probability map and four inner-angular-point probability maps, where the center-point probability map includes a predicted probability of each pixel in the top-view image being a center point, each of the inner-angular-point probability maps includes a predicted probability of each pixel in the top-view image being an inner angular point, and the four inner-angular-point probability maps correspond to different types of inner angular points of a parking space; and
obtaining a parking space detection result for the top-view image based on the center-point probability map and four inner-angular-point probability maps.

In an embodiment, the obtaining the obtaining a parking space detection result for the top-view image based on the center-point probability map and the four inner-angular-point probability maps includes:
determining, based on the center-point probability map, the number of one or more center points and a location of each of the center points;
determining, based on the four inner-angular-point probability maps, inner angular points related to the one or more center points; and
obtaining the parking space detection result for the top-view image based on the determined number and locations of the center points, locations of the inner angular points related to the center points, and a correlation between the center points and the inner angular points.

In an embodiment, the determining, based on the center-point probability map, the number of one or more center points and a location of each of the center points includes:
for each pixel in the center-point probability map, determining whether the predicted probability of the pixel being the center point exceeds a first preset probability threshold, and determining the pixel as the center point and increasing the number of the center points by 1 in a case that the predicted probability of the pixel being the center point exceeds the first preset probability threshold; and
converting coordinates of each pixel determined as the center point in a coordinate system for the top-view image into coordinates in a coordinate system for the scene according to a conversion relationship between the coordinate system for the top-view image and the coordinate system for the scene, to obtain a location of the center point in the coordinate system for the scene.

In an embodiment, the determining, based on the center-point probability map, one or more center points includes:
determining the center points based on the center-point probability map by applying a maximum value suppression algorithm.

In an embodiment, the obtaining a parking space detection result for the top-view image includes:
determining the total number of one or more parking spaces in the scene and a location of each of the parking spaces; or
determining the total number of one or more vacant parking spaces in the scene and a location of each of the vacant parking spaces; or
determining the total number of one or more vacant parking spaces meeting a preset requirement in the scene and a location of each of the vacant parking spaces meeting the preset requirement in the scene.

In an embodiment, the acquiring a top-view image of a scene includes:
acquiring preliminary images of the scene by using a camera mounted on a vehicle;
stitching the preliminary images of the scene to obtain a panoramic image; and
converting the panoramic image into the top-view image.

In an embodiment, the method further includes:
transmitting the parking space detection result to an auto parking assistance device of a vehicle, to cause the auto parking assistance device to plan a parking path and perform a parking control based on the parking space detection result.

According to one embodiment of the present disclosure, an apparatus for detecting a parking space is provided. The apparatus includes:

a top-view image acquisition device configured to acquire a top-view image of a scene;

a probability map acquisition device configured to perform a learning process on the top-view image to obtain a center-point probability map and four interior-angular-point probability maps, where the center-point probability map includes a predicted probability of each pixel in the top-view image being a center point, each of the inner-angular-point probability maps includes a predicted probability of each pixel in the top-view image being an inner angular point, and the four inner-angular-point probability maps correspond to different types of inner angular points of a parking space; and a parking space detection result acquisition device configured to obtain a parking space detection result for the top-view image based on the center-point probability map and the four inner-angular-point probability maps.

In an embodiment, the parking space detection result acquisition device includes:

a first determining device configured to determine, based on the center-point probability map, the number of one or more center points and a location of each of the center points;

a second determining device configured to determine, based on the four inner-angular-point probability maps, inner angular points related to the one or more center points; and a detection result acquisition device configured to obtain the parking space detection result for the top-view image based on the determined number and locations of the center points, locations of the inner angular points related to the center points, and a correlation between the center points and the inner angular points.

In an embodiment, the first determining device is configured to:

for each pixel in the center-point probability map, determine whether the predicted probability of the pixel being the center point exceeds a first preset probability threshold, and determine the pixel as the center point and increase the number of the center points by 1 in a case that the predicted probability of the pixel being the center point exceeds the first preset probability threshold; and convert coordinates of each pixel determined as the center point in a coordinate system for the top-view image into coordinates in a coordinate system for the scene according to a conversion relationship between the coordinate system for the top-view image and the coordinate system for the scene, to obtain a location of the center point in the coordinate system for the scene.

In an embodiment, the first determining device is configured to:

determine the center points based on the center-point probability map by applying a maximum value suppression algorithm.

In an embodiment, the parking space detection result acquisition device is configured to:

determine the total number of one or more parking spaces in the scene and a location of each of the parking spaces, or determine the total number of one or more vacant parking spaces in the scene and a location of each of the vacant parking spaces, or determine the total number of one or more vacant parking spaces meeting a preset requirement in the scene and a location of each of the vacant parking spaces meeting the preset requirement in the scene.

In an embodiment, the top-view image acquisition device includes:

a preliminary image acquisition device configured to acquire preliminary images of the scene by using a camera device mounted on a vehicle, an image stitching device configured to stitch the preliminary images of the scene to obtain a panoramic image, and an image conversion device configured to convert the panoramic image into the top-view image.

The parking space detection result may be applied to the field of automatic parking. With parking space detection result that is provided quickly and accurately, an automatic parking function of a vehicle provides users with a safer and more reliable automatic parking service. Therefore, in an embodiment, the apparatus further includes a transmitting device.

The transmitting device is configured to transmit the parking space detection result to an auto parking assistance device of a vehicle, to cause the auto parking assistance device to plan a parking path and perform a parking control based on the parking space detection result.

According to one embodiment of the present disclosure, a device is provided, including a processor and a memory.

The memory is configured to store a computer program.

The processor is configured to execute the computer program to implement the method for detecting a parking space according to the embodiments.

According to one embodiment of the present disclosure, a computer-readable storage medium is provided. The computer-readable storage medium stores a computer program. The computer program is configured to perform the method for detecting a parking space according to the embodiments.

Beneficial effects provided by embodiments of the present disclosure compared to a conventional technology are described below.

A method and an apparatus for detecting a parking space, a device, and a storage medium are provided according to the present disclosure. With the embodiments of the present disclosure, a top-view image of a scene is learned to obtain five probability maps, i.e., one center-point probability map and four inner-angular-point probability maps. The center-point probability map reflects the predicted probability of each pixel in the top-view image of the scene being a center point of a parking space. Each of the inner-angular-point probability maps reflects the predicted probability of each pixel in the top-view image of the scene being an inner angular point of a parking space. For each parking space, there is a geometric relationship (location relationship) between inner angular points of the parking space and the center point of the parking space. Therefore, a parking space detection result may be obtained by using the five probability maps outputted from a model. Embodiments in the present disclosure realize a rapid detection of parking spaces through a single stage by performing a learning process on a top-view image of a scene. In addition, the parking space detection in the embodiments of the present disclosure is not limited by types of parking spaces, and therefore can be used for detecting multiple types of parking spaces through a single process, which improves efficiency of the parking space detection.

BRIEF DESCRIPTION OF THE DRAWINGS

For clearer illustration of the embodiments of the present disclosure, hereinafter briefly described are the drawings to be applied in embodiments of the present disclosure. Apparently, the drawings in the following descriptions are only some embodiments of the present disclosure, and other drawings may be obtained.

DETAILED DESCRIPTION

As described above, the conventional method for detecting a parking space involves multiple stages, and thus is complicated and slow in execution. The conventional method cannot be used for detecting different types of parking spaces in a single detection process. In view of these issues, a method and an apparatus for detecting a parking space, a device and a storage medium are provided in the present disclosure. According to the present disclosure, one center-point probability map and four inner-angular-point probability maps are obtained by performing a learning process on a top-view image of a scene, and a parking space detection result corresponding to the top-view image is determined based on the one center-point probability map and four inner-angular-point probability maps. With the solution of the present disclosure, a process of detecting a parking space is simplified, and a speed of detecting a parking space is improved. Since the parking space in the scene is determined based on the center-point probability map and the inner-angular-point probability maps, the packing space detection is not limited by the type of the parking space, and therefore multiple types of parking spaces may be detected through a single detection process, and the detection efficiency is improved.

Figure 1:
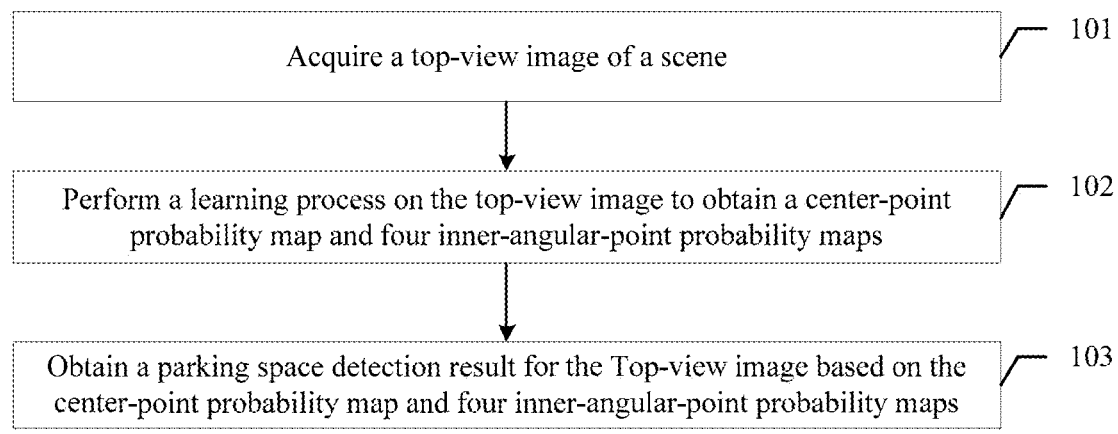
FIG. 1 is a flowchart of a method for detecting a parking space according to an embodiment of the present disclosure.

Reference is made to FIG. 1, which is a flowchart of a method for detecting a parking space according to an embodiment of the present disclosure. As shown in FIG. 1, the method includes process blocks 101 to 103.

In process block 101, a top-view image of a scene is acquired.

In an embodiment, a scene in which a parking space needs to be detected may be a parking lot, or a road or a space near a store on which parking spaces are arranged. In order to detect a parking space, a top-view image of the scene needs to be acquired. The top-view image is acquired because a sign for a parking space on the ground can be identified more accurately from an aerial perspective, and the sign is less likely to be distorted or deformed in the top-view image. Therefore, using the top-view image is beneficial to improving an accuracy and precision of parking space detection.

The top-view image of the scene may be acquired through in various manners.

As an example, the top-view image is acquired by a drone capturing a top view of the scene.

As another example, preliminary images of the scene are acquired by using a camera mounted on a vehicle. It is to be understood that the camera mounted on the vehicle to capture images in a direction exactly perpendicular to the ground. In order to obtain the top-view image, the preliminary images of the scene may be stitched to form a panoramic image, and the panoramic image is converted into the top-view image. Stitching of the preliminary images may be realized in various manners, which is not limited herein.

In process block 102, a learning process is performed on the top-view image to obtain a center-point probability map and four inner-angular-point probability maps.

In an implementation, the top-view image is processed by using a stacked network model, in order to obtain the center-point probability map and four inner-angular-point probability maps. In an implementation, the stacked network model is trained before execution of the method according to the embodiment of the present disclosure, and the model is configured to generate five maps as a basis for parking space detection, including one center-point probability map (also referred to as a center-point map) and four inner-angular-point probability maps (also referred to inner-angular-point maps).

A parking space may have a rectangular or parallelogram shape. For ease of understanding, the center point and the inner angular point are explained below.

Each parking space includes four different types of inner angular points, which are referred to as a first inner angular point, a second inner angular point, a third inner angular point and a fourth inner angular point herein, for the convenience of distinction. As an example, the first inner angular point and the second inner angular point are on a front edge of the parking space, and the third inner angular point and the fourth inner angular point are on a beck edge of the parking space. A line connecting the first inner angular point and the second inner angular point and a line connecting the third inner angular point and the fourth inner angular point are parallel to each other and of equal length. A line connecting the first inner angular point and the third inner angular point and a line connecting the second inner angular point and the fourth inner angular point are parallel to each other and of equal length. The line connecting the first inner angular point and the second inner angular point is shorter than the line connecting the first inner angular point and the third inner angular point.

Each parking space has a geometric center point. For example, the first inner angular point and the fourth inner angular point are vertices of a pair of opposite angles of the parking space; and the second inner angular point and the third inner angular point are vertices of the other pair of opposite angles of the parking space. An intersection of the line connecting the first inner angular point and the fourth inner angular point and the line connecting the second inner angular point and the third inner angular point is determined as a center point of the parking space.

Figure 2:
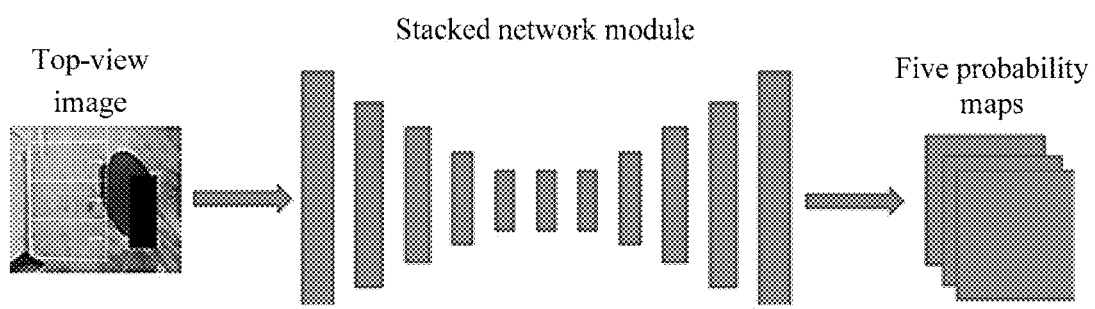
FIG. 2 is a schematic diagram of application of a stacked network model according to an embodiment of the present disclosure.

The stacked network model is designed from bottom to up. Reference is made to FIG. 2, which is a schematic diagram of application of a stacked network model according to an embodiment of the present disclosure. As shown in FIG. 2, an input of the stacked network model is the top-view image of the scene; an output of the stacked network model is the five probability maps. A process of using the stacked network model to process the top-view image includes extracting features of the top-view image.

The center point probability map outputted from the stacked network model includes a predicted probability of each pixel in the top-view image being a center point. In other words, a pixel value of each pixel in the center-point probability map indicates a predicted probability that the pixel in the top-view image is a center point. For example, in a case that the pixel value of a pixel having coordinates of (x1, y1) in the center-point probability map is 0.85, the predicted probability of the pixel having the coordinates of (x1, y1) in the top-view image being a center point of a parking space is 0.85. A larger pixel value of a pixel in the center-point probability map indicates that a pixel in the top-view image having coordinates corresponding to the pixel in the center-point probability map has a larger probability of being a center point of a parking space; and a smaller pixel value of a pixel in the center-point probability map indicates that a pixel in the top-view image having coordinates corresponding to the pixel in the center-point probability map has a smaller probability of being a center point of a parking space.

Each of the inner-angular-point probability maps outputted by the stacked network model includes a predicted probability of each pixel in the top-view image being an inner angular point. In other words, a pixel value of each pixel in the inner-angular-point probability map indicates a predicted probability that the pixel in the top-view image is an inner angular point. In an embodiment, the first inner angular point, the second inner angular point, the third inner angular point, and the fourth inner angular point corresponding to the four inner-angular-point probability maps, respectively. For example, in a case that a pixel value of a pixel having coordinates of (x2, y2) in an inner-angular-point probability map corresponding to the first inner angular point is 0.01, the predicted probability of the pixel having the coordinates of (x2, y2) in the top-view image being a first inner angular point of a parking space is 0.85. In the inner-angular-point probability map corresponding to the first inner angular point, a larger pixel value of a pixel in the inner-angular-point probability map indicates that a pixel in the top-view image having coordinates corresponding to the pixel in the inner-angular-point probability map has a larger probability of being a first inner angular point of a parking space; and a smaller pixel value of a pixel in the inner-angular-point probability map indicates that a pixel in the top-view image having coordinates corresponding to the pixel in the inner-angular-point probability map has a smaller probability of being a first inner angular point of a parking space.

The above-described implementation of performing a learning process on the top-view image of the scene by using the stacked network model is merely exemplary. Other devices may be applied to perform a learning process on the top-view image and obtain the five probability maps. An implementation of this step is not specifically limited herein.

In process block 103, a parking space detection result for the top-view image is obtained based on the center-point probability map and the four inner-angular-point probability maps.

In some embodiments, a point with a large predicted probability of being a center point of a parking space m ay be determined based on the center-point probability map. Similarly, a point with a large predicted probability of being an inner angular point of a parking space may be determined based on one of the inner-angular-point probability maps. Since there is a geometric relationship between the four inner angular points of a parking space and the center point of the parking space, a center point of a parking space and corresponding inner angular points of the parking space may be determined based on the geometric relationship, the determined point with a large predicted probability of being a center point, and the point with a large predicted probability of being an inner angular point. Hence, the parking space detection result for the top-view image is obtained.

In an implementation, since a parking space has one center point, the number of parking spaces may be determined as the total number of the center points determined. The location of each of the center points may be represented using a location in the top-view image or a location in the scene. After a location of a center point is determined, locations of four inner angular points related to the center point may be determined based on an inherent positional relationship between a center point and inner angular points of a same parking space.

The parking space detection result may include various types of content, such as the total number of parking spaces in the scene and a location of each of the parking spaces, the total number of vacant parking spaces in the scene and a location of each of the vacant parking spaces, or the total number of one or more vacant parking spaces that meet a preset requirement in the scene and a location of each of the vacant parking spaces that meet a preset requirement in the scene.

A location of a parking space may be expressed as:

[$L_{center}$, $L_{inner1}$, $L_{inner2}$, $L_{inner3}$, $L_{inner4}$]

In the above expression, $L_{center}$ represents the location of the center point of the parking space, $L_{inner1}$ represents the location of the first inner angular point, $L_{inner2}$ represents the location of the second inner angular point, $L_{inner3}$ represents the location of the third inner angular point, and $L_{inner4}$ represents the location of the fourth inner angular point.

In a practice, the parking space detection result may include contents meeting a preset requirement.

As an example, the preset requirement is to provide the number and locations of vacant parking spaces arranged along a horizontal direction on the top-view image, a vertical direction on the top-view image, and a diagonal direction on the top-view image, and thus the parking space detection result includes the number and locations of vacant parking spaces meeting the above requirement.

As another example, the preset requirement is to provide a location of a vacant parking space closest to an entrance/exit of a parking lot, and thus the parking space detection result includes the locations of a vacant parking space meeting the preset requirement.

Described above is the method for detecting a parking space according to an embodiment of the present disclosure. With the method, feature extraction is performed on the top-view image, and the center-point probability map and four inner-angular-point probability maps are obtained; and a parking space detection result for the top-view image is obtained based on the center-point probability map and the four inner-angular-point probability maps. The method enables to detect multiple types of parking spaces with a single process. In addition, the method enables to directly obtain multiple probability maps by performing a learning process on the top-view image, which is convenient and rapid, and improves efficiency of the parking space detection.

Figure 3:
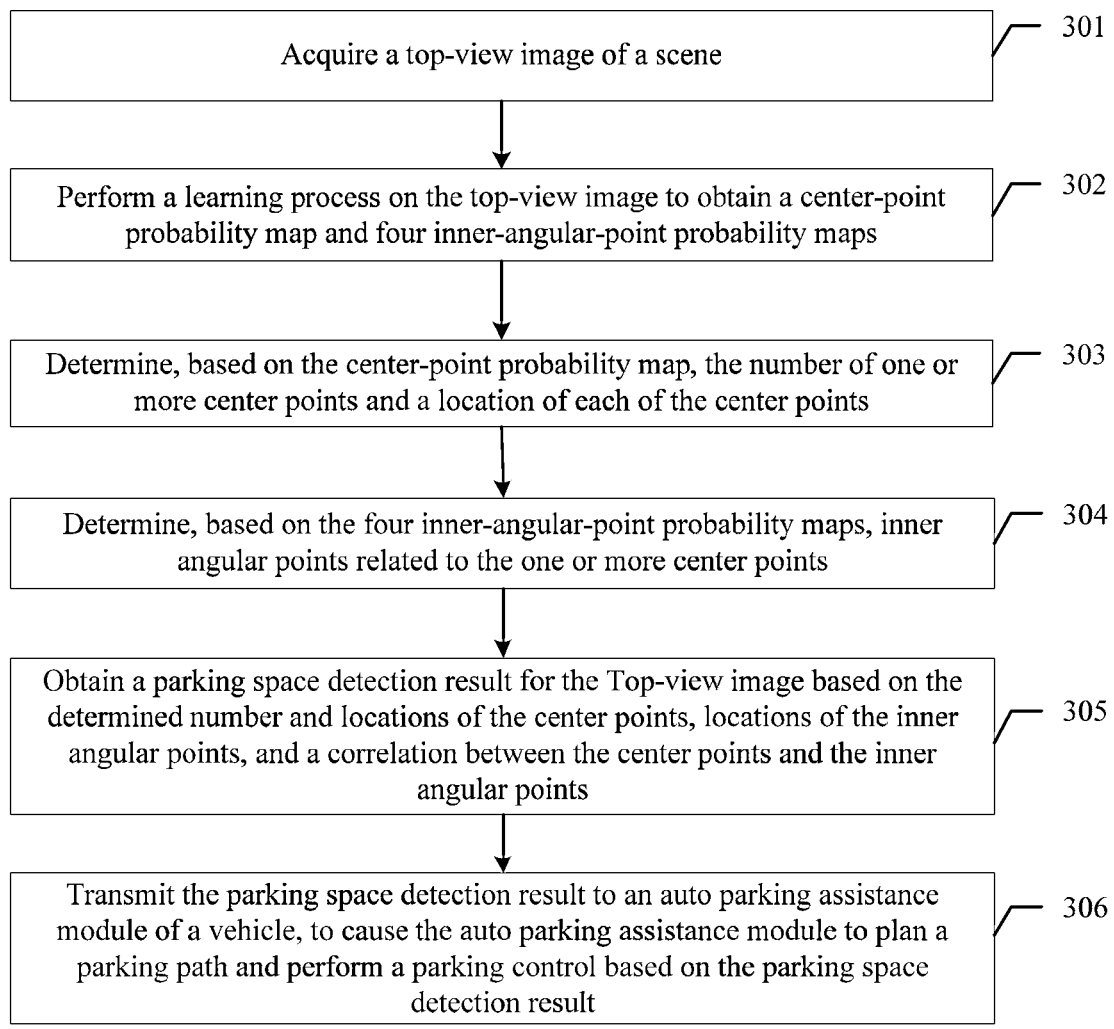
FIG. 3 is a flowchart of a method for detecting a packing space according to an embodiment of the present disclosure.

A method for detecting a parking space is further provided according to another embodiment of the present disclosure, which is described below with reference to the accompanying drawings. Reference is made to FIG. 3, which is a flowchart of a method for detecting a parking space according to another embodiment of the present disclosure. The method includes process blocks 301 to 306 as follows.

In process block 301, a top-view image of a scene is acquired.

In process block 302, a learning process is performed on the top-view image to obtain a center-point probability map and four inner-angular-point probability maps.

In process block 303, the number of one or more center points and a location of each of the center points are determined based on the center-point probability map.

In an implementation, process block 303 may include:
determining, for each pixel in the center-point probability map, whether the predicted probability of the pixel being a center point exceeds a first preset probability threshold; in a case that the predicted probability of the pixel being the center point exceeds the first preset probability threshold, determining the pixel as the center point, and increasing the number of the center points by 1; and in a case that the predicted probability of the pixel being the center point does not exceeds the first preset probability threshold, determining whether the predicted probability of a next pixel being a center point exceeds a first preset probability threshold. The first preset probability threshold may be set based on an actual requirement, for example, set to 0.7 or 0.75.

In addition, a center point may be determined based on the center-point probability map by applying a maximum value suppression algorithm. The maximum value suppression algorithm is a known algorithm in the field, and is not described in detail herein.

Coordinates of the pixel determined as the center point in a coordinate system for the top-view image is converted into coordinates in a coordinate system for the scene according to a conversion relationship between the coordinate system for the top-view image and the coordinate system for the scene, to obtain a location of the center point in the coordinate system for the scene. As an example, a transformation matrix of the coordinate system for the scene relative to the coordinate system for the top-view image is a matrix E, and the location $P_B$ of a center point in the scene may be obtained by multiplying coordinates $P_A$ of the center point in the coordinate system for the top-view image by the transformation matrix E.

In process block 304, inner angular points related to the one or more center points are determined based on the four inner-angular-point probability maps.

In process block 305, a parking space detection result for the top-view image is obtained based on the determined number and locations of the center points, locations of the inner angular points related to the center points, and a correlation between the center points and the inner angular points.

After the process blocks 301 to 305, the parking space detection result for the top-view image is obtained. The parking space detection result may be applied to the field of automatic parking. With a parking space detection result that is provided quickly and accurately, an automatic parking function of a vehicle provides users with a safer and more reliable automatic parking service. Therefore, after the parking space detection result is obtained, the method according to an embodiment may further include process block 306.

In process block 306, the parking space detection result is transmitted to an auto parking assistance device of a vehicle, to cause the auto parking assistance device to plan a parking path and perform a parking control based on the parking space detection result.

In a case that the parking space detection result indicates that there is a vacant parking space or a vacant parking space that meets a preset requirement, it may be considered that a parking position is provided for the auto parking assistance device. Hence, the auto parking assistance device may create a smoother parking path based on the parking position, and perform a parking control based on the parking path, to smoothly park a vehicle into the vacant parking space or the vacant parking space that meets a preset requirement.

The parking control may include: controlling a gear position of a vehicle, controlling rotational speeds of wheels, and the like. Specific implementation of the parking control is not limited herein.

Based on the method for detecting a parking space according to the foregoing embodiments, an apparatus for detecting a parking space is further provided according to an embodiment of the present disclosure. The apparatus is described below by ways of embodiments.

Figure 4:
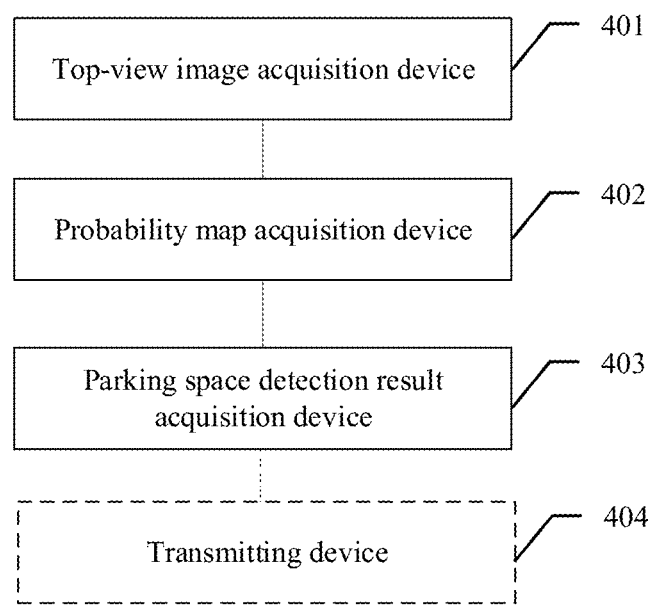
FIG. 4 is a schematic structural diagram of a device for detecting a parking space according to an embodiment of the present disclosure.

Reference is made to FIG. 4, which is a schematic structural diagram of an apparatus for detecting a parking space according to an embodiment of the present disclosure.

As shown in FIG. 4, the apparatus for detecting a parking space includes a top-view image acquisition device 401, a probability map acquisition device 402, and a parking space detection result acquisition device 403.

The top-view image acquisition device 401 is configured to acquire a top-view image of a scene.

The probability map acquisition device 402 is configured to perform a learning process on the top-view image to obtain a center-point probability map and four inner-angular-point probability maps outputted from a stacked network model. The center-point probability map includes a predicted probability of each pixel in the top-view image being a center point. Each of the inner-angular-point probability map includes a predicted probability of each pixel in the top-view image being an inner angular point. The four inner-angular-point probability maps correspond to different types of inner angular points of a parking space.

The parking space detection result acquisition device 403 is configured to obtain a parking space detection result for the top-view image based on the center-point probability map and the four inner-angular-point probability maps.

There are five probability maps mentioned, including one center-point probability map and four inner-angular-point probability maps. The center-point probability map reflects the predicted probability of each pixel in the top-view image of the scene being a center point of a parking space. Each of the inner-angular-point probability maps reflects a predicted probability of each pixel in the top-view image of the scene being an inner angular point of a parking space. For each parking space, there is a geometric relationship (location relationship) between inner angular points of the parking space and the center point of the parking space. Therefore, a parking space detection result may be obtained by using the five probability maps. Compared with the conventional technology, embodiments in the present disclosure realize a rapid detection of parking spaces through a single stage by performing a learning process on a top-view image of a scene. In addition, the parking space detection performed by the apparatus is not limited by types of parking spaces, and therefore can be used for detecting multiple types of parking spaces through a single process, which improves efficiency of the parking space detection.

In an embodiment, the parking space detection result acquisition device 403 includes a first determining device, a second determining device, and a parking space detection result acquisition device.

The first determining device is configured to determine, based on the center-point probability map, the number of one or more center points and a location of each of the center points.

The second determining device is configured to determine, based on the four inner-angular-point probability maps, inner angular points related to the center points.

The detection result acquisition device is configured to obtain the parking space detection result for the top-view image based on the determined number and locations of the center points, locations of the inner angular points related to the center points, and a correlation between the center points and the inner angular points.

In an embodiment, the first determining device is configured to:
for each pixel in the center-point probability map, determine whether the predicted probability of the pixel being the center point exceeds a first preset probability threshold, and determine the pixel as the center point and increase the number of the center points by 1 in a case that the predicted probability of the pixel being the center point exceeds the first preset probability threshold; and
convert coordinates of each pixel determined as the center point in a coordinate system for the top-view image into coordinates in a coordinate system for the scene according to a conversion relationship between the coordinate system for the top-view image and the coordinate system for the scene, to obtain a location of the center point in the coordinate system for the scene.

In an embodiment, the first determining device is configured to:
determine the center points based on the center-point probability map by applying a maximum value suppression algorithm.

In an embodiment, the parking space detection result acquisition device 403 is configured to:
determine the total number of one or more parking spaces in the scene and a location of each of the parking spaces, or
determine the total number of one or more vacant parking spaces in the scene and a location of each of the vacant parking spaces, or
determine the total number of one or more vacant parking spaces meeting a preset requirement in the scene and a location of each of the vacant parking spaces meeting the preset requirement in the scene.

In an embodiment, the top-view image acquisition device 401 includes a preliminary image acquisition device, an image stitching device, and an image conversion device.

The preliminary image acquisition device is configured to acquire preliminary images of the scene by using a camera device mounted on a vehicle.

The image stitching device is configured to stitch the preliminary images of the scene to obtain a panoramic image.

The image conversion device is configured to convert the panoramic image into the top-view image.

The parking space detection result may be applied to the field of automatic parking. With a parking space detection result that is provided quickly and accurately, an automatic parking function of a vehicle provides users with a safer and more reliable automatic parking service. Therefore, in an example, the apparatus for detecting a parking space may further include a transmitting device 404.

The transmitting device 404 is configured to transmit the parking space detection result to an auto parking assistance device of a vehicle, to cause the auto parking assistance device to plan a parking path and perform a parking control based on the parking space detection result.

Based on the method and apparatus for detecting a parking space provided according to the foregoing embodiments, a device for parking space detection is further provided according to an embodiment of the present disclosure. The device includes a processor and a memory.

The memory is configured to store a computer program.

The processor is configured to execute the computer program stored in the memory to implement some or all of steps in the method for detecting a parking space according to any of the method embodiments.

In addition, based on the method and apparatus for detecting a parking space according to the foregoing embodiments, and the device according to the foregoing embodiments, a computer-readable storage medium is further provided according to an embodiment of the present disclosure. The computer-readable storage medium is configured to store a computer program, and the computer program is configured to perform some or all of steps in the method for detecting a parking space according to any of the method embodiments.

It should be noted that the embodiments are described in this specification in a progressive manner. Various embodiments may refer to each other for the same or similar parts, and each embodiment places emphasis on the difference from other embodiments. In particular, since the apparatus and system disclosed in the embodiments is basically similar to the method therein, the description of the apparatus and the system is relatively simple, and reference may be made to the description of the method for relevant matters. The above-described system and the embodiments of the system are only illustrative. A unit described as a discrete component may or may not be physically separated. Components shown as a unit may or may not be a physical unit, that is, the components may be located in one place or may be distributed onto multiple networked units. Some or all devices thereof may be selected based on an actual requirement, to implement the embodiments.

The invention claimed is:

1. A method for detecting a parking space, comprising:
   acquiring a top-view image of a scene;
   performing a learning process on the top-view image to obtain a center-point probability map and four inner-angular-point probability maps, wherein the center-point probability map comprises a predicted probability of each pixel in the top-view image being a center point, each of the inner-angular-point probability maps comprises a predicted probability of each pixel in the top-view image being an inner angular point, and the four inner-angular-point probability maps correspond to different types of inner angular points of a parking space; and
   obtaining a parking space detection result for the top-view image based on the center-point probability map and four inner-angular-point probability maps.

2. The method according to claim 1, wherein the obtaining a parking space detection result for the top-view image based on the center-point probability map and the four inner-angular-point probability maps comprises:
   determining, based on the center-point probability map, the number of one or more center points and a location of each of the center points;
   determining, based on the four inner-angular-point probability maps, inner angular points related to the one or more center points; and obtaining the parking space detection result for the top-view image based on the determined number and locations of the center points, locations of the inner angular points related to the center points, and a correlation between the center points and the inner angular points.

3. The method according to claim 2, wherein the determining, based on the center-point probability map, the number of one or more center points and a location of each of the center points comprises:

for each pixel in the center-point probability map, determining whether the predicted probability of the pixel being the center point exceeds a first preset probability threshold, and in a case that the predicted probability of the pixel being the center point exceeds the first preset probability threshold, determining the pixel as the center point and increasing the number of the center points by 1; and converting coordinates of each pixel determined as the center point in a coordinate system for the top-view image into coordinates in a coordinate system for the scene according to a conversion relationship between the coordinate system for the top-view image and the coordinate system for the scene, to obtain a location of the center point in the coordinate system for the scene.

4. The method according to claim 2, wherein the determining, based on the center-point probability map, one or more center points comprises:

determining the center points based on the center-point probability map by applying a maximum value suppression algorithm.

5. The method according to claim 1, wherein the obtaining a parking space detection result for the top-view image comprises:

determining a total number of one or more parking spaces in the scene and a location of each of the parking spaces; or determining the total number of one or more vacant parking spaces in the scene and a location of each of the vacant parking spaces; or determining the total number of one or more vacant parking spaces meeting a preset requirement in the scene and a location of each of the vacant parking spaces meeting the preset requirement in the scene.

6. The method according to claim 1, wherein the acquiring a top-view image of a scene comprises:

acquiring preliminary images of the scene by using a camera mounted on a vehicle;

stitching the preliminary images of the scene to obtain a panoramic image; and converting the panoramic image into the top-view image.

7. The method according to claim 1, further comprising:

transmitting the parking space detection result to an auto parking assistance device of a vehicle, to cause the auto parking assistance device to plan a parking path and perform a parking control based on the parking space detection result.

8. A device, comprising:

a memory configured to store a computer program; and a processor configured to execute the computer program to implement the method for detecting a parking space according to claim 1.

9. A non-transitory computer-readable storage medium storing a computer program, wherein the computer program is configured to perform the method for detecting a parking space according to claim 1.

* * * * *